Aug. 29, 1967  E. A. MARKS ET AL  3,339,167
SPRING-LOADED LINEAR DISPLACEMENT POTENTIOMETER
Filed June 6, 1966
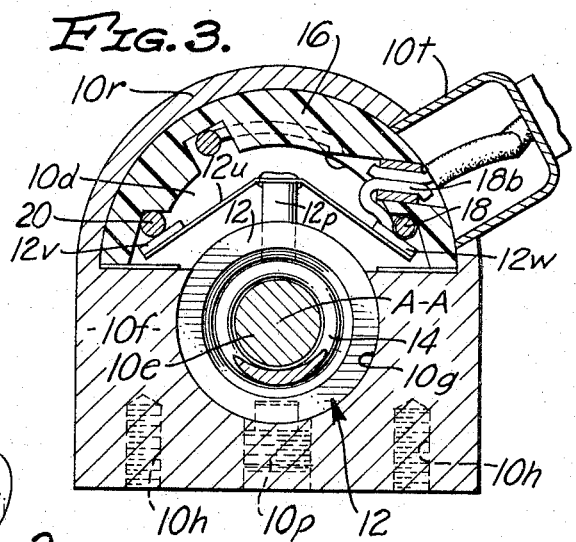
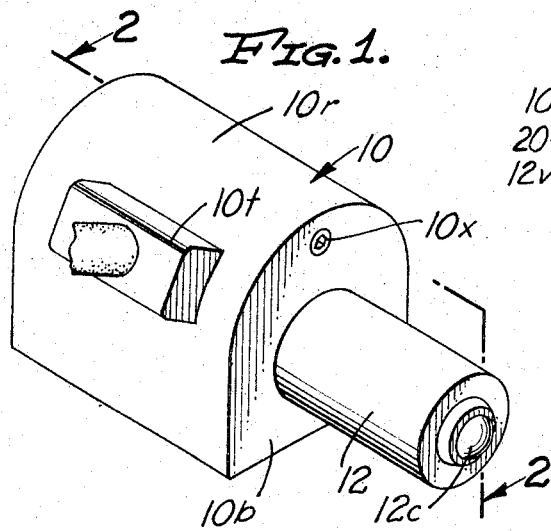
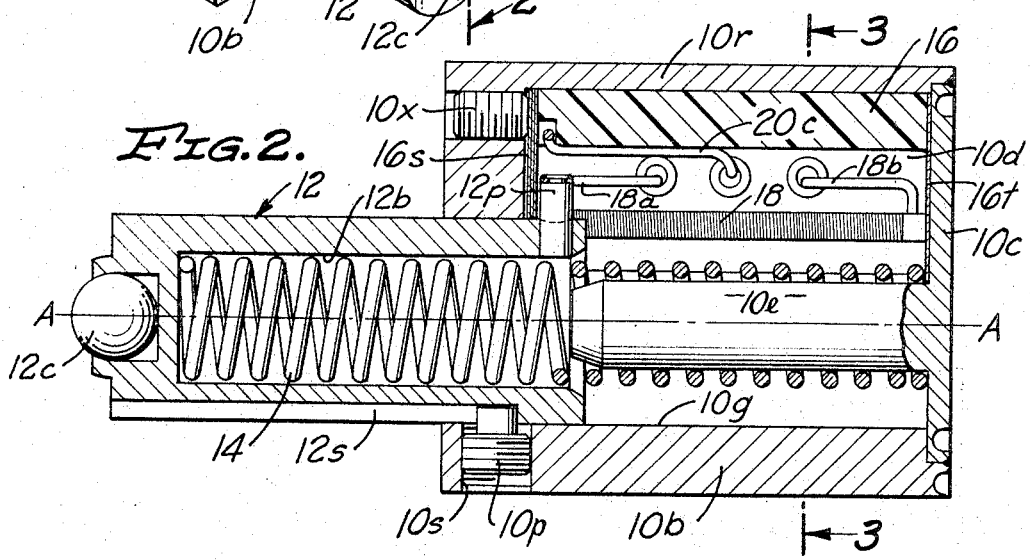
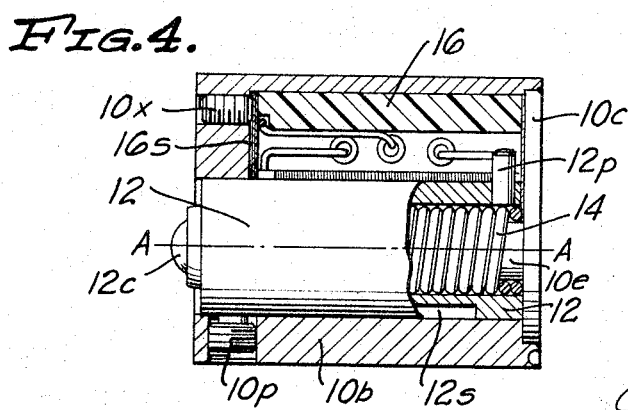
INVENTORS
EUGENE A. MARKS,
ROBERT C. PARKINSON,
RICHARD VELASCO
BY

United States Patent Office 3,339,167
Patented Aug. 29, 1967

3,339,167
SPRING-LOADED LINEAR DISPLACEMENT POTENTIOMETER
Eugene A. Marks, Robert C. Parkinson, and Richard Velasco, Riverside, Calif., assignors to Bourns, Inc.
Filed June 6, 1966, Ser. No. 555,467
3 Claims. (Cl. 338—183)

The invention herein disclosed pertains to potentiometric instruments used to indicate the extent of displacement of a member in a selected line direction, and more particularly to improvements in such instruments, commonly termed spring-loaded linear motion potentiometers (LMP), whereby the space required for the instrument longitudinally of the direction of motion is grossly decreased and in minimum-length attitude is not appreciably longer than the extent of maximum linear motion the instrument is capable of transducing, despite the movable member being spring-loaded.

In the prior art spring-loaded linear position potentiometers, such as those illustrated in the patents to Nelson, Nos. 2,273,760 and 2,197,312, for example, the minimum axial dimension of the instrument has been the sum of the thickness of the housing ends plus the length of the compressed spring plus at least a substantial fraction of the length of the resistance element. The same is true of other exemplary prior art spring-loaded linear position potentiometers, for examples those illustrated in the patents to Gottschall et al. 2,900,615, to Karg 2,975,389, to Tietig 2,627,593, Clason 3,018,457, and Addy et al. 2,248,047.

In many applications of linear displacement potentiometers, and especially in applications of spring-loaded potentiometers for accurately translating position or displacement of a member relative to another, space is at a premium and it is desirable in the extreme to minimize the over-all length of the instrument. The present invention provides a spring-loaded displacement transducer in which the novel arrangement of follower slide or actuator, loading spring, housing and potentiometer components are such that the effective stroke is nearly half the over-all extended length of the instrument and is nearly as much as the minimum over-all length of the instrument; and such that the loading spring is closely restricted and guided throughout its entire length whether extended or compressed, so that the spring is unfailingly and uniformly effective irrespective of the stroke of the instrument. According to the invention the actuator or slide is formed as a hollow cylinder having at an outer end a follower for receiving motion to be transduced, the slide being reciprocably received in a guideway provided in a housing in which resistance and return-conductor elements are disposed parallel to the guideway, and in which housing a compression spring acts against the interior of the follower end of the slide and against an opposite inner wall of the housing and is guided externally by the cylindrical inner wall of the slide and internally by a cylindrical post affixed to or integral with the housing wall. Thus in the compressed state the spring is entirely compressed within the hollow interior of the slide and encircles the post, whereas when expanded by extending the slide to the maximum reach of the instrument half of the spring is encircled by and guided by the inner cylindrical wall of the slide and the other half encircles and is internally guided by the post. By that unique combination, an effectively long compression spring is used without undesirably adding to the length of the instrument. The slide at an inner end carries contact means and conductor means serving to interconnect points along the contact zone of the resistance element to a return conductor.

The previous brief description of the invention makes it evident that it is a principal object of the invention to provide novel improvements in spring-loaded linear displacement potentiometers.

Another object of the invention is to provide a compact spring-loaded linear displacement potentiometer of minimum feasible length.

Other objects and advantages of the invention will hereinafter be set forth or made evident in the appended claims and following detailed description of an exemplary preferred form of the invention as illustrated in the accompanying drawings forming part of this specification. In the drawings:

FIGURE 1 is a pictorial view of the exemplary spring-loaded linear displacement potentiometer in fully-extended attitude, drawn to grossly enlarged scale;

FIGURE 2 is a longitudinal partial sectional view of the potentiometer, the section being taken as indicated by arrow points and broken line 2—2 in FIGURE 1, but drawn to a somewhat enlarged scale;

FIGURE 3 is a transverse sectional view of the exemplary potentiometer showing relative arrangement of slider, slider guideway, resistance element, contact, and return conductor relative to the potentiometer housing, and illustrating the concentric arrangement of spring-guiding post, loading spring, and spring-guiding and spring-loaded slider;

FIGURE 4 is a partial sectional view of the exemplary potentiometer, illustrating the relative positioning of the slide, spring, and housing in the fully contracted or compressed condition.

Referring to the drawings the exemplary potentiometer comprises a housing 10 of metal, the illustrated housing being comprised principally of an integral base 10b and an end plate or cover 10c welded around its periphery to the base at an otherwise open end as indicated in FIGURE 2. Preferably the housing is of stainless steel. The base has a deep floor portion 10f (FIGURE 3) and a curved roof 10r between which is a chamber 10d in which other components are disposed. The thick floor of the base preferably has provision for fixedly securing the potentiometer to a machine or other device, and thus may be provided with upwardly-directed tapped mounting holes 10h (FIGURE 3) or apertured flanges (not shown) or other conventional mounting arrangements. Also the floor portion of the base is provided with a longitudinally-extending partial section of a bore having a wall of arcuate cross-section which in turn provides a guideway 10g or guide means for a complementary substantially cylindrical slide 12. The guideway thus provides an axis as indicated by line A—A in FIGURE 2 which axis is coincident with that of the slide 12. The slide 12 is arranged for reciprocation in the guideway, between an extreme extended attitude or position indicated in FIGURE 2 and an extreme contracted attitude or position indicated in FIGURE 4. The slide is made with a cylindrical recess or bore 12b (FIGURE 2) dimensioned for reception and guidance of convolutions or turns of a helical compression spring 14. The outer end of the slide is provided with a follower surface which is adapted to bear against the member whose displacement axially of the slide the potentiometer is to indicate or transduce. As shown, a captive ball 12c forms or provides the active follower surface and constitutes a follower; the ball being retained in a recess in the outer end of the slide by peening-over of a portion of the slide as indicated in FIGURE 2. Rotation of the slide in the guideway is prevented by interaction of the cylindrical inner end of a plug 10p which is tightly received in a threaded bore 10s (FIGURE 2) provided in the floor of the housing; the reduced inner end of the plug being received in a complementary longitudinal slot 12s provided at the bottom of slide 12. The slot 12s is terminated adjacent the inner end of the slide, whereby plug 10p further serves to prevent unwanted escape of the slide from the guideway and to limit outward travel of the slide.

Affixed to, or forming part of, cover 10c of the housing is a stationary guide means 10e (FIGURE 2) in the form of an outstanding cylindrical stub whose function is to guide and receive convolutions of spring 14 and prevent buckling of the spring. The stud or guide thus is arranged coaxial with the cylindrical recess 12b of the slide, and of external diameter somewhat less than the internal diameter of spring 14 when the latter is fully compressed. The stud further is of such length as to extend substantially to the inner end of bore 12b of the slide when the latter is forced to its extreme inward position in the housing and guideway 10g. Thus it is seen that the slide is urged outwardly toward extreme extended attitude (FIGURE 2) by spring 14 which bears at one end against the end wall of bore 12b and at the other end against the inside wall provided by cover 10c; and that at all times all of the convolutions of the spring are guided and constrained, either externally by the cylindrical wall of bore 12b or by the cylindrical outer surface of guide means 10e, or by both of those elements. The helical compression spring 14 is disposed with its helix coaxial with guide 10e and bore 12b, and as a consequence friction effects in the instrument as a whole are minimized, especially when the contact of the follower 12c with the driving or displacing member is on axis A—A.

It is evident that by arranging the spring 14 and the spring guide 10e to be received in their entireties within the cylindrical recess 12b of the slide, the effective stroke of the slide from one extreme position to the other can be almost equal to the over-all length of the entire structure in the contracted state as illustrated in FIGURE 4. Thus a maximum of stroke is attained with a minimum of axial length of instrument.

The slide 12, responding exactly to movement of follower 12c by the actuating part or device to be monitored, is used to translate one component of the resistance-element-and-contact combination relative to the other. Conveniently, the contact device is mounted on the slide for movement along a rectilinear path parallel to the resistance element. To that end the slide carries an upstanding post 12p at its inner end, to which post a spring-leaf contact device 12u (FIGURE 3) is secured. Preferably post 12p is of electrical insulation, and conductive device 12u is centrally perforated and riveted or adhesively affixed to the post as indicated. Thus the contact device has translated to it with precision the axial displacements of follower 12c.

Fitted in the chamber 10d between the roof 10r and floor 10f of the housing, and bearing against said roof, is a shaped block or support 16, preferably of insulation as shown and which is arranged to support an elongate resistance element 18. The resistance element, which may be of the wire-wound type, is adhesively secured in a groove formed in support 16. It is provided with end terminal means including terminal conductors 18a and 18b (FIGURE 2) which extend into a terminal cap 10t in which they are potted and from which they extend for external connections. The resistance element is disposed for brushing interaction with a contact 12w conductively affixed to, or formed as an integral part of, device 12u; whereby a contact zone of element 18 is effectively brushed or wiped by the contact incident to displacement of slide 12 relative to the housing. An electrical return for the contact device 12u is provided by conductor means which preferably comprises an elongate return conductor 20 (FIGURE 3) which is arranged parallel to element 18 in a groove in support 16. The contact device 12u in the preferred construction illustrated comprises a brush 12v disposed for sliding contact along conductor 20, and the latter element has a terminal conductor 20c connected thereto and extending through passages formed in support 16, to and through cap 10t and thence to the exterior of the potentiometer.

Adjustment of the end setting of the potentiometer can be effected prior to welding cover 10c onto base 10b, by forcibly driving support 16 inwardly against insulative shim means 16s at the inner end of chamber 10d, and then forcing the support outwardly as necessary by means of an adjusting screw 10x (FIGURE 2). Outer shim means 16t are then used to pack any unoccupied space at the cover end of the support. Preferably at least one shim is employed at each end of the support, for insulation purposes, the shims being flat and of shape conforming to the ends of chamber 10d.

The preceding description of a preferred exemplary potentiometer according to the principles of the invention makes it evident that the aforementioned objects of the invention have been attained. In the light of the description and drawings, modifications within the true scope and spirit of the invention will occur to those skilled in the art and hence it is not desired to restrict the scope of the invention to details of the illustrated embodiment except as may be required by the appended claims.

We claim:
1. A linear displacement potentiometer adapted for transduction of extents of linear movement of a member into corresponding changes of electric resistance exhibited between terminals, said potentiometer comprising:
   first means, including stationary means, providing an elongate housing and guide means defining a linear axis, said stationary means further providing an elongate inner spring-guide disposed along and around an extent of said axis;
   second means, including an elongate slide device having an outer follower end and being reciprocable along said guide means and confined by the latter to linear movements outwardly from and inwardly into said housing, said slide device having an elongate recess therein around and along an extent of said axis and said recess arranged to receive said spring-guide therein incident to movement into said housing;
   third means, including an elongate compression coil spring arranged to be guided by and between said spring-guide and the encircling wall of said elongate recess and thereby confined to linear contractive and expansive movements within an elongate annular cylindrical space whose inner diameter is fixed by the cross-section of said spring-guide and whose outer diameter is fixed by the encircling wall of said elongate recess, said spring at one end thereof pressing against said first means and at its other end against said slide device to tend to move the latter outwardly of said chamber;
   and fourth means, including a first potentiometer means comprising an elongate resistance element in said housing disposed generally parallel to said axis, said fourth means further including a second potentiometer means comprising a wiper and means mounting one of said first and second potentiometer means on said stationary means and the other thereof on said slide device for relative wiping movement therebetween incident to linear movement of said slide along said guide means, to provide change of electrical resistance exhibited between said wiper and either end of said resistance element commensurate with the extent of such linear movement, and means providing respective electrical connections to said wiper and at least one electrical end of said resistance element, and terminals for said connections accessible at the exterior of said housing,
   whereby a maximum practical ratio of maximum displacement of said slide device to minimum length of said housing is attained.

2. A linear displacement potentiometer according to claim 1, in which said first means further includes means for adjustably positioning said resistance element relative to said slide device whereby to permit adjustment of the end resistance of said potentiometer.

3. A spring-loaded linear displacement potentiometer comprising:

first means, including relatively stationary means providing a housing forming an interior chamber and an elongate cylindrical stud joined to an interior wall of the housing and defining a linear axis, and said first means being arranged to provide guide means disposed parallel to said axis;

elongate slide means having at an outer end a follower and further having a bore therein disposed about and substantially coaxial with said axis and having engagement with said guide means in said housing so as to be restricted and guided thereby in linear movements inwardly an doutwardly of said housing along said guide means;

elongate compression coil-spring means disposed along and about said axis with at least one end portion disposed and confined in said bore and at least the other end portion encircling said stud and confined thereby and disposed in compression urging said slide means outwardly of said housing along said guide means, said spring means being substantially completely contained in said bore incident to full inward movement of said slide means;

resistive means including an elongate resistance element supported in said housing by said stationary means parallel to said axis and having terminal connections thereto accessible at the exterior of said housing;

contact means mounted on said slide means for movement therewith and having a contact in linear brushing engagement with said resistance element; and electrical return conductor means in said housing serving to provide an electrical return from said contact and having an end accessible at the exterior of said housing;

whereby the lengths of the said resistance element and of the full stroke of said slide means may be substantially as great as the interior length of said housing.

References Cited
UNITED STATES PATENTS

| | | | |
|---|---|---|---|
| 2,780,702 | 2/1957 | Bourns | 338—183 |
| 2,979,684 | 4/1961 | Looney et al. | 338—183 |
| 3,029,404 | 4/1962 | Huard | 338—183 |
| 3,138,777 | 6/1964 | Wormser et al. | 338—183 |

ROBERT S. MACON, *Primary Examiner.*

H. HOHAUSER, *Assistant Examiner.*